United States Patent
Zhang et al.

(10) Patent No.: US 12,439,345 B2
(45) Date of Patent: Oct. 7, 2025

(54) METHODS AND APPARATUSES FOR CONTROLLING TRANSMISSION POWER, AND STORAGE MEDIUM

(71) Applicant: BEIJING XIAOMI MOBILE SOFTWARE CO., LTD., Beijing (CN)

(72) Inventors: Hua Zhang, Beijing (CN); Deqian Wang, Beijing (CN); Jie Zhang, Beijing (CN); Chao Wu, Beijing (CN); Shui Liu, Beijing (CN); Xin Liu, Beijing (CN)

(73) Assignee: BEIJING XIAOMI MOBILE SOFTWARE CO. LTD., Beijing (CN)

( * ) Notice: Subject to any disclaimer, the term of this patent is extended or adjusted under 35 U.S.C. 154(b) by 407 days.

(21) Appl. No.: 17/894,632

(22) Filed: Aug. 24, 2022

(65) Prior Publication Data

US 2023/0388937 A1 Nov. 30, 2023

(30) Foreign Application Priority Data

May 26, 2022 (CN) .......................... 202210590580.9

(51) Int. Cl.
*H04W 52/22* (2009.01)
*H04W 52/24* (2009.01)
*H04W 52/36* (2009.01)

(52) U.S. Cl.
CPC ......... *H04W 52/225* (2013.01); *H04W 52/24* (2013.01); *H04W 52/367* (2013.01)

(58) Field of Classification Search
CPC ............. H04W 52/367; H04W 52/146; H04W 52/225; H04W 52/246; H04W 52/34;
(Continued)

(56) References Cited

U.S. PATENT DOCUMENTS

2015/0072721 A1* 3/2015 Lagnado ............... H04W 52/28
                                                              455/522
2019/0124605 A1* 4/2019 Park .................... H04W 52/367
(Continued)

FOREIGN PATENT DOCUMENTS

EP        3 474 609 A1    4/2019
WO   WO 2021/043153 A1    3/2021

OTHER PUBLICATIONS

Extended European Search Report Issued Aug. 17, 2023 in European Application 22192767.6, 8 pages.
(Continued)

*Primary Examiner* — Golam Sorowar
(74) *Attorney, Agent, or Firm* — Oblon, McClelland, Maier &Neustadt, L.L.P.

(57) ABSTRACT

A method and an apparatus for controlling a transmission power, and a storage medium. The method includes: determining a target number of transmission cycles according to a service scenario of an electronic device, wherein a preset time window is divided into the target number of transmission cycles, and the preset time window is a test cycle used in a specific absorption rate (SAR) test of the electronic device; determining at least one of an upper limit value or a lower limit value of a transmission power corresponding to each transmission cycle, wherein an average value of transmission powers in the preset time window complies a SAR requirement; and controlling the electronic device to transmit and receive signals using a corresponding transmission power in each transmission cycle.

18 Claims, 5 Drawing Sheets

(58) Field of Classification Search
CPC ............. H04W 52/365; H04W 52/281; H04W 52/228; H04W 52/38; H04W 72/0473; H04W 52/283; H04W 52/346; H04W 52/36; H04W 52/42; H04W 52/0216; H04W 52/18; H04W 52/02; H04W 52/16; H04W 72/56; H04W 52/223; H04W 52/288; H04W 52/44; H04W 52/343; H04W 72/02; H04W 72/0453; H04W 72/1268; H04W 8/24; H04W 88/06; H04W 52/14; H04W 52/226
See application file for complete search history.

(56) References Cited

U.S. PATENT DOCUMENTS

| | | | |
|---|---|---|---|
| 2020/0275387 A1 | 8/2020 | Park et al. | |
| 2024/0137875 A1* | 4/2024 | Huang | H04W 52/225 |
| 2024/0196344 A1* | 6/2024 | Aagiru | H04W 52/367 |
| 2024/0196394 A1* | 6/2024 | Guo | H04W 72/51 |
| 2024/0214953 A1* | 6/2024 | Nadakuduti | H04W 52/146 |
| 2024/0244539 A1* | 7/2024 | Tiirola | H04W 52/367 |

OTHER PUBLICATIONS

Office Action issued Mar. 4, 2024, in corresponding Indian Patent Application No. 202244048543 (with English Translation), citing document 15 therein, 6 pages.

\* cited by examiner

METHODS AND APPARATUSES FOR CONTROLLING TRANSMISSION POWER, AND STORAGE MEDIUM

CROSS-REFERENCE TO RELATED APPLICATION

The disclosure claims a priority to and benefits of Chinese Patent Application No. 202210590580.9 filed on May 26, 2022, the contents of which are incorporated herein by reference in their entireties for all purposes.

FIELD

The present disclosure relates to the field of control technologies, and more particularly, to a method and an apparatus for controlling a transmission power, and a storage medium.

BACKGROUND

In a process of transmitting radio waves from an electronic device to a base station, when the transmission power of the electronic device exceeds certain strength, the electronic device may affect health of a human body. Therefore, a transmission function of the electronic device needs to comply with relevant regulations of SAR (Specific Absorption Rate).

SUMMARY

The present disclosure provides a method and an apparatus for controlling a transmission power, and a storage medium.

According to a first aspect of embodiments of the present disclosure, a method for controlling a transmission power is provided. The method can include determining a target number of transmission cycles according to a service scenario of an electronic device, in which a preset time window is divided into the target number of transmission cycles, and the preset time window is a test cycle used in a specific absorption rate (SAR) test of the electronic device. The method can further include determining at least one of an upper limit value or a lower limit value of a transmission power corresponding to each transmission cycle, in which an average value of transmission powers in the preset time window complies a SAR requirement, and controlling the electronic device to transmit and receive signals using a corresponding transmission power in each transmission cycle.

According to a second aspect of embodiments of the present disclosure, an apparatus for controlling a transmission power is provided. The apparatus includes a processor and a memory configured to store a computer program that are executable by the processor, in which when the computer program is executed by the processor, the processor is configured to determine a target number of transmission cycles according to a service scenario of an electronic device, in which a preset time window is divided into the target number of transmission cycles, and the preset time window is a test cycle used in a specific absorption rate (SAR) test of the electronic device; determine at least one of an upper limit value or a lower limit value of a transmission power corresponding to each transmission cycle, in which an average value of transmission powers in the preset time window complies a SAR requirement; and control the electronic device to transmit and receive signals using a corresponding transmission power in each transmission cycle.

According to a third aspect of embodiments of the present disclosure, a non-transitory computer-readable storage medium is provided. When a computer program stored in the storage medium is executed by a processor, a method for controlling transmission power is implemented. The method includes determining a target number of transmission cycles according to a service scenario of an electronic device, in which a preset time window is divided into the target number of transmission cycles, and the preset time window is a test cycle used in a specific absorption rate (SAR) test of the electronic device; determining at least one of an upper limit value or a lower limit value of a transmission power corresponding to each transmission cycle, in which an average value of transmission powers in the preset time window complies a SAR requirement; and controlling the electronic device to transmit and receive signals using a corresponding transmission power in each transmission cycle.

It is to be understood that the foregoing general description and the following detailed description are exemplary and explanatory only, which will not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. It should be noted that features in the following embodiments and implementations may be combined with each other without conflict.

Figure 1:
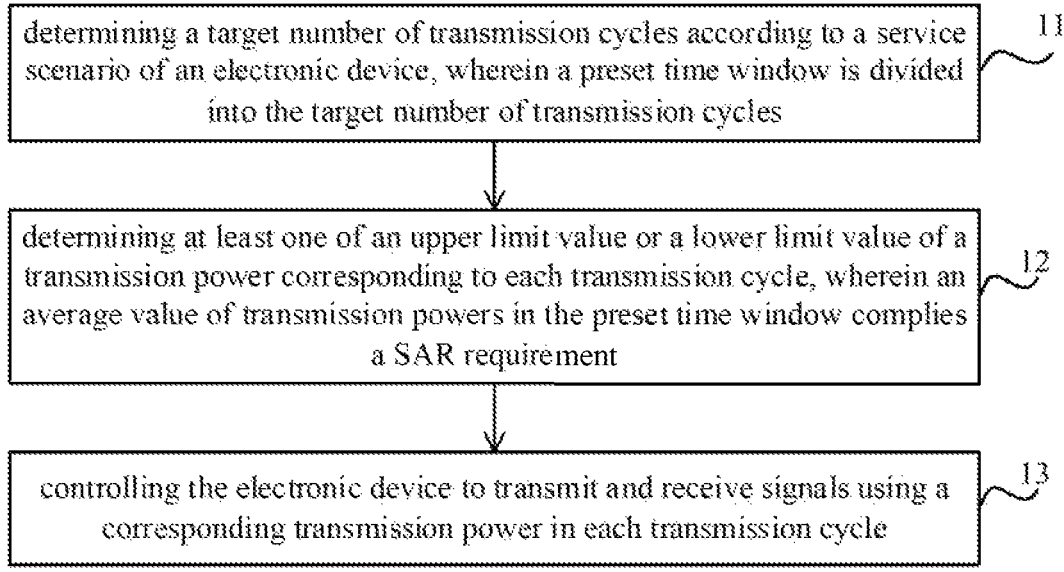
FIG. 1 is a flowchart illustrating a method for controlling a transmission power according to an illustrative embodiment of the present disclosure.

For solving the above technical problem, embodiments of the present disclosure provide a method for controlling a transmission power. FIG. 1 is a flowchart of a method for controlling a transmission power according to an illustrative embodiment of the present disclosure. Referring to FIG. 1, the method for controlling a transmission power may include blocks 11 to 13.

At block 11, a target number of transmission cycles is determined according to a service scenario of an electronic device. A preset time window is divided into the target number of transmission cycles, and the preset time window is a test cycle used in a specific absorption rate (SAR) test of the electronic device.

In an example, the electronic device may obtain a type of a current service. When the type of the current service is at least one of a non-continuous type and a non-real-time type, such as web pages, Weibo or uploading files, etc., the electronic device may determine that the service scenario of the electronic device is a first service scenario. When the type of the current service of the electronic device is a continuous and real-time type, such as calls, games, etc., the electronic device may determine that the service scenario of the electronic device is a second service scenario. When the type of the current service is a mixed business type, the electronic device may determine that the service scenario of the electronic device is a third service scenario, in which the mixed business type refers to including the continuous and real-time type and at least one of the non-continuous type and non-real-time type, or refers to that the current service includes both the continuous and real-time service and at least one of the non-continuous service and non-real-time service.

In an example, after determining the service scenario of the electronic device, the electronic device may determine the target number of the transmission cycles into which the preset time window is divided according to the above service scenario. The preset time window refers to the test cycle used in the compliance test for SAR of the electronic device. For example, International Commission on Non-Ionizing Radiation Protection (ICNIRP) and Federal Communications Commission (FCC) uses different time windows. Taking a frequency band of sub6G as an example, the preset time window corresponding to ICNIRP is 360 s and the preset time window corresponding to FCC is 100 s. In related arts, one higher transmission power and one lower transmission power will be arranged within the above preset time window. In order to meet the SAR requirement, a time period when transmitting at low power is usually long, which is not conducive to the continuous and real-time service.

In an example, the electronic device may determine the target number of transmission cycles into which the preset time window is divided, as follows: the greater a number of continuous and real-time services included in the service scenario, the greater a value of the target number; or the greater a number of non-continuous services and non-real-time services included in the service scenario, the smaller the value of the target number.

The continuous and real-time service has a high requirement on real-time. Taking a call as an example, in related arts, only one time period in the preset time window adopts the higher transmission power to send and receive the signals (hereinafter referred to as a third time period), and quality of the call during the third time period is high. However, the remaining time period adopts the lower transmission power to send and receive the signals (hereinafter referred to as a fourth time period), and the quality of the call during the fourth time period is low, and even the problem of call interruption occurs.

In this embodiment, with dividing the preset time window into a plurality of transmission cycles, each transmission cycle includes one higher transmission power for transmitting and receiving the signals, that is, a first time period, and one lower transmission power for transmitting and receiving the signals, that is, a second time period, so the quality of the call in the first time period is high and the quality of the call in the second time period is low. Considering that when the number of the transmission cycles increases, a length of the second time period of each transmission cycle is less than a length of the fourth time period of the preset time window, that is, the second time period of each transmission cycle reaches the next transmission cycle before the quality of the call does not decline to affect the call (or the user feels the decline in the quality of the call), continuing to use the higher transmission power to send and receive the signals and resuming the high-quality call, achieving an effect of ensuring the high-quality call.

Taking three service scenarios as examples, the electronic device may determine the target number of the transmission cycles into which the preset time window is divided. The method may include, when the service scenario is a first service scenario, the electronic device may determine that the target number of the transmission cycles is a first number: or when the service scenario is a second service scenario, the electronic device may determine that the target number of the transmission cycles is a second number; or when the service scenario is a third service scenario, the electronic device may determine that the target number of the transmission cycles is a third number. The third service scenario refers to that the type of the current service of the electronic device is a mixed service type. The first number is less than the third number, and the third number is less than the second number.

In an embodiment, considering different proportion of the continuous and real-time services in the mixed service type, the third number may take a plurality of values, both falling within a range formed by taking the first number and the second number as endpoint values. It is understandable that the first number, the third number and the second number may be selected appropriate values according to a specific scenario. For example, a value of the first number may be 2, a value of the second number may be 10, and the third number may take a value in a range of values from 3 to 9. The corresponding solution falls into the protection scope of the present disclosure.

In an embodiment, the electronic device may store with a mapping relationship between the service scenario and the target number. For example, a variety of service scenarios may be built according to service types supported by the electronic device, such as the first service scenario, the second service scenario and the third service scenario; then, the target number corresponding to each service scenario is determined. For example, the target number corresponding to the first service scenario may be 2, the target number corresponding to the second service scenario may be 10, and the target number corresponding to the third service scenario may take the value in the range of values from 3 to 9. A data table, as a preset mapping relationship between the service scenario and the target number, may be obtained by mapping the service scenario and the target number one by one, get, and stored in a specified position, such as a cache, a local storage or a cloud. In this way, after obtaining the service scenario, the electronic device may query the above data table according to a scenario identification code of the service scenario to obtain the corresponding target number.

At block 12, at least one of an upper limit value or a lower limit value of a transmission power corresponding to each transmission cycle is determined. An average value of transmission powers in the preset time window complies a SAR requirement.

In an example, the electronic device may determine the at least one of the upper limit value and the lower limit value of the transmission power of the electronic device corresponding to each transmission cycle within the preset time window. The upper limit value of the transmission power refers to a maximum value of the transmission power of the electronic device in the first time period of the transmission cycle, and the lower limit value of the transmission power refers to a minimum value of the transmission power of the electronic device in the second time period of the transmission cycle. The first time period and the second time period forms a transmission cycle, and a ratio of the First time period to the transmission cycle is a duty cycle of the upper limit value of the transmission power, and a ratio of the second time period to the transmission cycle is a duty cycle of the lower limit value of the transmission power. Understandably, the third one may be determined when any two of the upper limit value (or the lower limit value), the average value, and the duty cycle are known.

In an example, the electronic device may determine the upper limit value of the transmission power of the electronic device in each transmission cycle according to the service scenario, and keep the lower limit value of the transmission power unchanged. See FIG. 2, the method may include blocks 21 to 22.

At block 21, the electronic device may determine an upper limit adjustment value of the transmission power corresponding to each transmission cycle according to the service scenario. The upper limit values of the transmission power corresponding to all transmission cycles in the preset time window may be the same, or the upper limit value of the transmission power corresponding to at least one transmission cycle in the preset time window may be different from the upper limit values corresponding to other transmission cycles. Those skilled may select the upper limit value of the transmission power corresponding to each transmission cycle according to the specific service scenario.

In this block, the upper limit adjustment value refers to variation value of the power for the transmission power that may be increased on the basis of the limited power Plimit (such as 20 dbm) corresponding to the SAR requirement, that is, the part of the power that may exceed the above limited power. The greater a number of continuous and real-time services included in the service scenario, the smaller the upper limit adjustment value of the transmission power; or the greater a number of non-continuous services and non-real-time services included in the service scenario, the greater the upper limit adjustment value of the transmission power. For example, when the service scenario is the first service scenario, the electronic device may determine that the upper limit adjustment value is a first adjustment value. For another example, when the service scenario is the second service scenario, the electronic device may determine that the upper limit adjustment value is a second adjustment value. For another example, when the service scenario is the third service scenario, the electronic device may determine that the upper limit adjustment value is a third adjustment value. The second adjustment value is less than the third adjustment value, and the third adjustment value is less than the first adjustment value.

Figure 3:
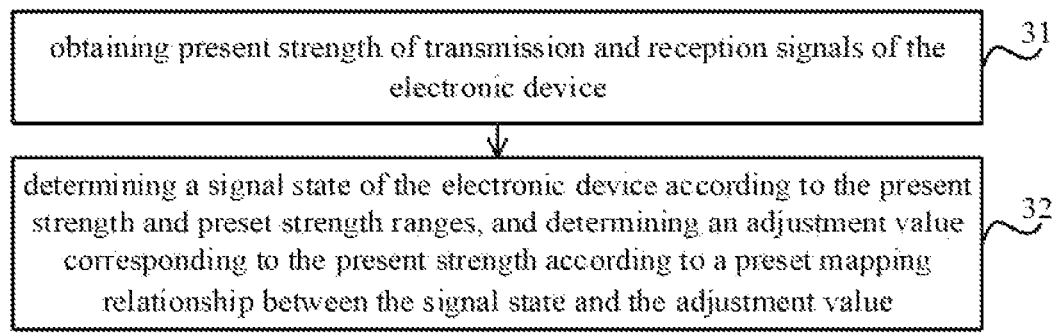
FIG. 3 is a flowchart illustrating an effect of determining an upper limit adjustment value according to an illustrative embodiment of the present disclosure.

In an example, the upper limit adjustment value may be set to a fixed value (such as 5 dBm) or a dynamic value. When the upper limit adjustment value is a dynamic value, referring to FIG. 3, the electronic device may obtain the upper limit adjustment value in the following way which may include blocks 31 to 33.

At block 31, the electronic device may obtain present strength of transmission and reception signals of the electronic device. The present strength may be strength of a transmission signal, strength of a reception signal, or a quality of a channel between a terminal and a base station, which may be selected according to the specific scenario, and will not be limited hereinafter. Taking the present strength being the strength of the transmission signal ($SI_{Tx}$) and the strength of the reception signal ($SI_{Rx}$) as an example, after obtaining the strength of the transmission signal and the strength of the reception signal, the electronic device may input the strength of the transmission signal and the strength of the reception signal into a preset formula $y=a \times SI_{Tx}+b \times SI_{Rx}+c$, to obtain the present strength y. Those skilled may adjust a calculation manner according to the content of the present strength, and the corresponding solution falls into the protection scope of the present disclosure.

At block 32, the electronic device may determine a signal state of the electronic device according to the present strength and preset strength ranges, and determine an adjustment value corresponding to the present strength according to a preset mapping relationship between the signal state and the adjustment value. Continuing with taking the present strength being the strength of the transmission signal ($SI_{Tx}$) and the strength of the reception signal ($SI_{Rx}$) as an example, the electronic device may set three preset strength ranges, namely, a first range, a second range and a third range. The first range, the second range and the third range forms a value range of the strength of the transmission and reception signals of the electronic device. Each value in the first range is greater than each value in the second range, and each value in the second range is greater than each value in the third range. After obtaining the present strength, the electronic device may compare the present strength with each preset strength range to determine which preset strength range the present strength is within, and obtain the adjustment value corresponding to the preset strength range.

For example, when the present strength is within the first range, the electronic device may determine that the adjustment value corresponding to the present strength is a first preset adjustment value according to the preset mapping relationship between the signal state and the adjustment value. For another example, when the present strength is within the second range, the electronic device may determine that the adjustment value corresponding to the present strength is a second preset adjustment value. For another example, when the present strength is within the third range, the electronic device may determine that the adjustment value corresponding to the present strength is a third preset adjustment value. It should be noted that the signal state may be set according to the specific scenario, such as four signal states, and the corresponding solution falls into the protection scope of the present disclosure.

TABLE 1 mapping relationship between preset strength range and adjustment value

| preset strength range | adjustment value | value range |
| --- | --- | --- |
| first range | first preset adjustment value | [7, 9] |
| second range | second preset adjustment value | [4, 6] |
| third range | third preset adjustment value | (0, 3] |

In this way, this example may set different upper limit adjustment values at different signal strengths, that is, the upper limit adjustment value decreases as the signal becomes weaker, which is conducive to reducing the transmission power, so as to avoid too large the duty cycle of the transmission power in the second period of the transmission cycle, and avoid the problem of uplink signal deterioration.

At block 22, the electronic device may determine the upper limit value of the transmission power corresponding to each transmission cycle by obtaining a sum of a limited power under the SAR requirement and the upper limit adjustment value.

The electronic device may determine the transmission power of the electronic device in the first time period of each transmission cycle according to the limited power under the SAR requirement and the upper limit adjustment value, that is, the upper limit value is equal to the sum of the limited power and the upper limit adjustment value. For example, when the limited power Plimit is 15 dBm and the upper limit adjustment value is 3 dBm, the transmission power Pmax of electronic device in each transmission cycle is 15+3=18 dBm and the effect is shown in FIG. 4.

Figure 4:
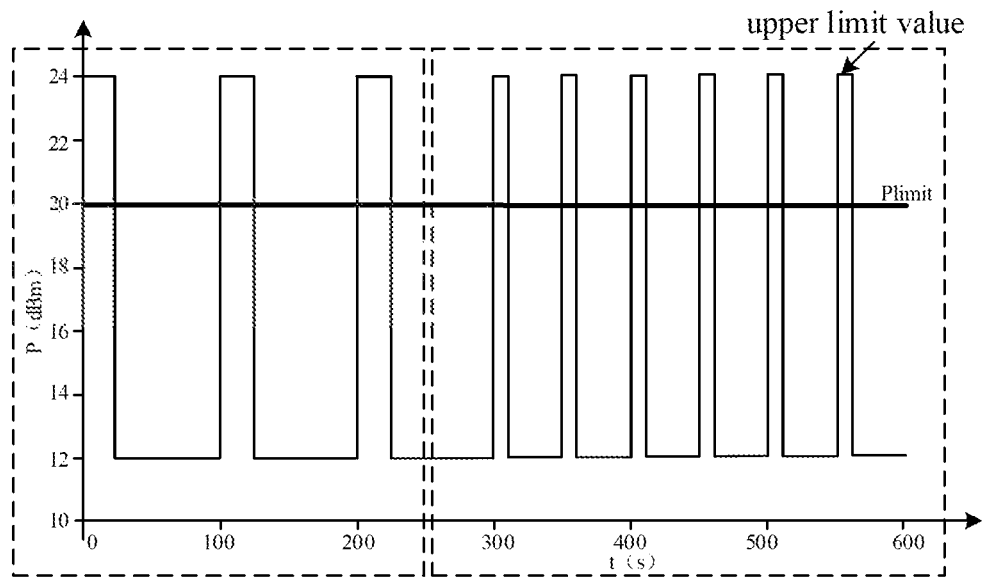
FIG. 4 is a schematic diagram illustrating an effect of setting two transmission cycles in a preset time window according to an illustrative embodiment of the present disclosure.

Referring to FIG. 4, the left side illustrates a curve of the transmission power in the preset time window in related art. For example, within 0-100 s, it includes one third time period (0-20 s, 24 dBm) and one fourth time period (20-100 s, 12 dBm). The right side illustrates a curve of the transmission power of each cycle in the two transmission cycles in the present disclosure. For example, within 300-400 s, it includes two first time periods (300-310 s, 350-360 s, 24 dBm) and two second time periods (310-350 s, 360-400 s, 12 dbm). Comparing the left side and the right side of FIG. 4, it shows that, within the preset time window of the electronic device, the number of the first time periods (such as 2) on the right side increases compared with the number of the third time period (such as 1) on the left side.

Continuing to refer to FIG. 4, when the upper limit values of the transmission power on the left side and the right side are the same, the length of the third time period in the preset time window on the left is equal to a sum of the lengths of the first time periods in all transmission cycles on the right. The difference is that the increase in the number of the transmission cycles on the right causing increase in a frequency of entering the first time period in the preset time window. Each first time period adopts the upper limit value to send and receive the signals, which may improve quality of communication.

Figure 5:
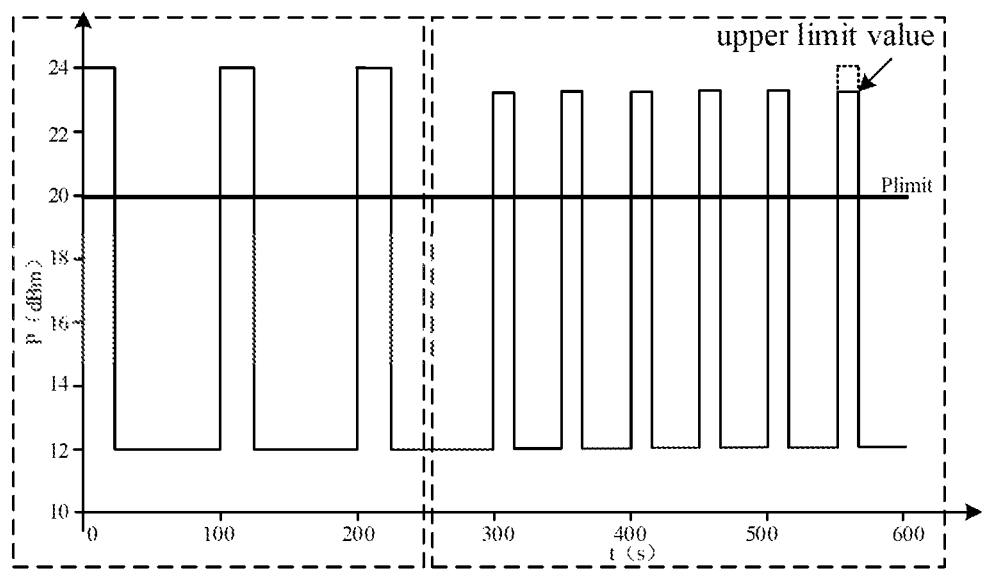
FIG. 5 is a schematic diagram illustrating an effect of setting two transmission cycles in a preset time window and adjusting an upper limit value of transmission power according to an illustrative embodiment of the present disclosure.

Referring to FIG. 5, when the upper limit value of the transmission power in the transmission cycle on the right side is less than the upper limit value of the transmission power on the left side, compared with the upper limit value shown in FIG. 4, the change of the upper limit value shown by a dotted line in FIG. 5. The sum of the lengths of the first time periods of all transmission cycles on the right side increases, causing the duty cycle of the larger transmission power in the preset time window to increase, which is conducive to improving the quality of the communication.

Figure 6:
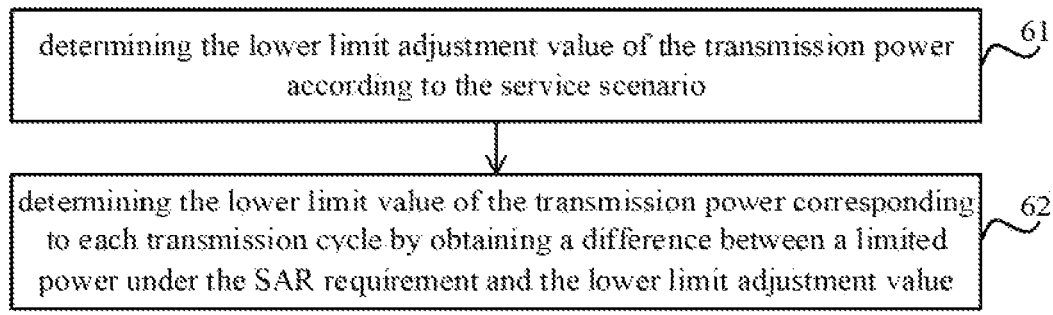
FIG. 6 is a flowchart illustrating an effect of determining a lower limit adjustment value according to an illustrative embodiment of the present disclosure.

In another example, the electronic device may determine the lower limit value of the transmission power of the electronic device and keep the upper limit value unchanged. Referring to FIG. 6, the method may include blocks 61 and 62. At block 61, the electronic device may determine the lower limit adjustment value of the transmission power according to the service scenario. The lower limit adjustment value refers to variation value of the power for the transmission power that may be decreased on the basis of the limited power Plimit corresponding to the SAR requirement, that is, the part of the power that may be lower than the limited power. At block 62, the electronic device may determine the lower limit value of the transmission power corresponding to each transmission cycle by obtaining a difference between the limited power under the SAR requirement and the lower limit adjustment value.

Understandably, the lower limit adjustment may be set to a Fixed value (such as 3 dBm) or a dynamic value. When the lower limit adjustment value is the dynamic value, the setting manner may refer to the setting manner of the upper limit adjustment value, that is, the lower limit adjustment value may be determined according to the signal state of the electronic device. The value of the lower limit preset amount obtained falls into the protection scope of the present disclosure under a condition that the second time period may be shortened or the transmission power within the second time period may be increased.

In an example, when the lower limit adjustment value is a dynamic value, the electronic device may determine the lower limit adjustment value according to the present service scenario. For example, when the service scenario is the first service scenario, the electronic device may determine that the lower limit adjustment value is a fourth preset adjustment value (such as 4 dBm). For another example, when the service scenario is the second service scenario, the electronic device may determine that the lower limit adjustment value is a fifth preset adjustment value (such as 1 dBm). When the service scenario is the third service scenario, the electronic device may determine that the lower limit adjustment value is a sixth preset adjustment value (such as 3 dBm). In this example, the fourth preset adjustment value is greater than the sixth preset adjustment value, and the sixth preset adjustment value is greater than the fifth preset adjustment value. Taking the fourth preset adjustment value greater than the sixth preset adjustment value as an example, it is to provide a larger lower transmission power for the third service scenario, that is, the transmission power in the second time period of each transmission cycle becomes larger.

The electronic device may determine the transmission power of the electronic device in the second time period of each transmission cycle according to the limited power under the SAR scene and the lower limit adjustment value. For example, when the limited power Plimit is 20 dBm and the lower limit adjustment value is 6 dBm, the lower limit value of the transmission power of the electronic device in each transmission cycle is 20−6=14 dBm, and the effect is shown in FIG. 7.

Figure 7:
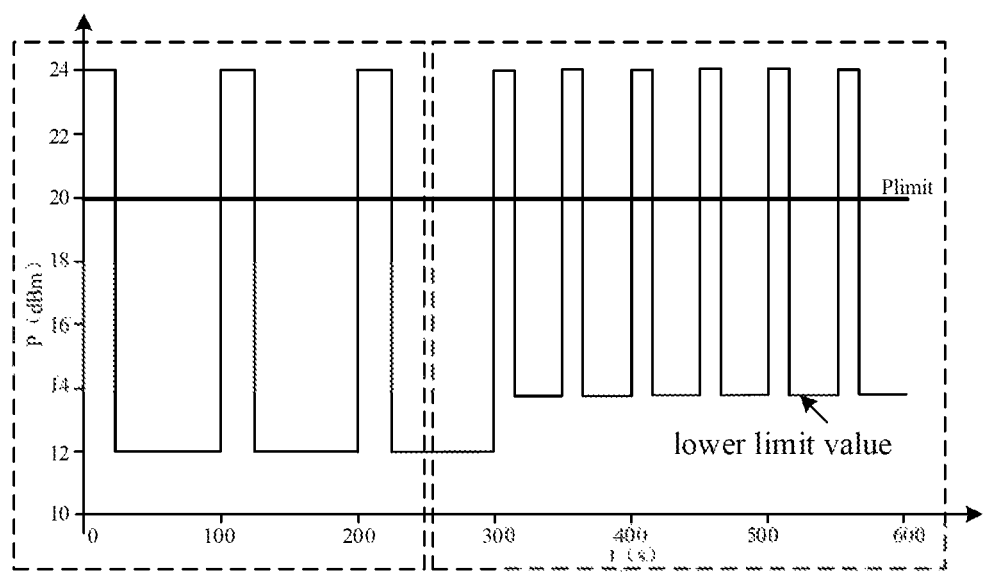
FIG. 7 is a schematic diagram illustrating an effect of adjusting a lower limit value of transmission power corresponding to each transmission cycle according to an illustrative embodiment of the present disclosure.

Referring to FIG. 7, the left side illustrates a curve of the transmission power in the preset time window in related art. For example, within 0~100 s, it includes one third time period (0~20 s, 24 dBm) and one fourth time period (20~100 s, 12 dBm). The right side illustrates a curve of the transmission power of each cycle in the two transmission cycles in the present disclosure. For example, within 300~400 s, it includes two first time periods (300~310 s, 350~360 s, 24 dBm) and two second time periods (310~350 s, 360~400 s, 14 dbm). Comparing the left side and the right side of FIG. 7, it shows that, within the preset time window of the electronic device, the number of the first time periods (such as 2) on the right side increases compared with the number of the third time period (such as 1) on the left side, causing increase in the frequency of entering the first time period in the preset time window. Each first time period adopts the upper limit value to send and receive the signals, which may improve the quality of the communication. And the transmission power of each second time period on the right side is 2 dBm higher than that of the second time period on the left side, which may also improve the quality of the communication during the second time period.

Figure 2:
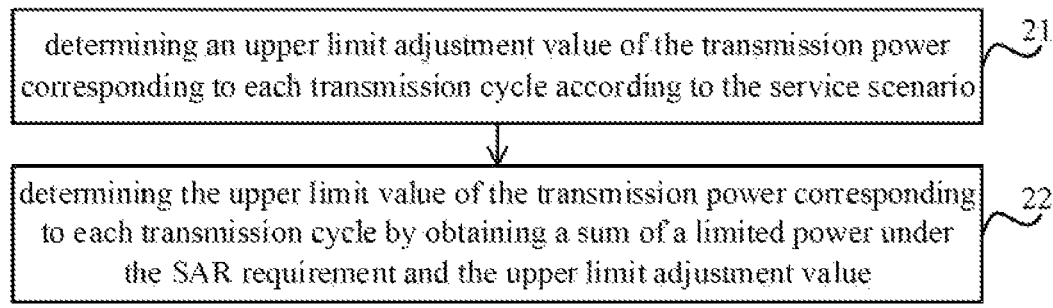
FIG. 2 is a flowchart illustrating a method for determining an upper limit value of transmission power corresponding to each transmission cycle according to an illustrative embodiment of the present disclosure.

It should be noted that the solution in FIG. 2 illustrates the solution of adjusting the upper limit value of the transmission power corresponding to each transmission cycle, and the solution in FIG. 5 illustrates the solution of adjusting the lower limit value of the transmission power corresponding to each transmission cycle. In another embodiment, in order to better adjust the transmission power corresponding to each transmission cycle, the solutions of FIG. 2 and FIG. 5 may be combined, and the upper limit value and lower limit value of the transmission power may be adjusted simultaneously. The combined solution falls within the protection scope of the present disclosure.

At block 13, the electronic device is controlled to transmit and receive signals using a corresponding transmission power in each transmission cycle.

So far, according to the solution provided by embodiments of the present disclosure, the target number of the transmission cycles into which the preset time window is divided may be determined according to the service scenario of the electronic device. The preset time window refers to the test cycle used in the compliance test for SAR of the electronic device. The at least one of the upper limit value and the lower limit value of the transmission power corresponding to each transmission cycle is determined. The average value of transmission power in the preset time window complies with the SAR requirement. The electronic device is controlled to transmit and receive the signals using the corresponding transmission power in each transmission cycle. In this embodiment, the preset time window is divided into the target number of transmission cycles, so that the upper limit value may be used to transmit and receive the signals in each transmission cycle, or the frequency of transmitting and receiving the signals with the upper limit value is increased, which may improve the quality of the signals under the condition of meeting the requirements of SAR, avoid problems of silent or dropped calls, and improve experience of using the electronic device.

Figure 8:
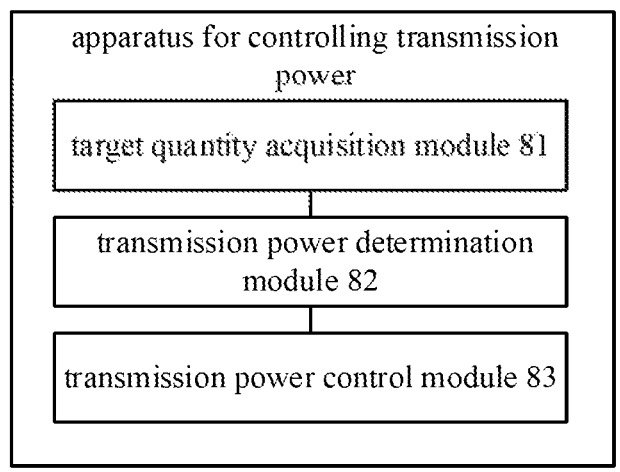
FIG. 8 is a block diagram illustrating an apparatus for controlling a transmission power according to an illustrative embodiment of the present disclosure.

On the basis of the method for controlling a transmission power provided by embodiments of the present disclosure, embodiments of the present disclosure also provide an apparatus for controlling a transmission power, applicable to an electronic device. Referring to FIG. 8, the apparatus includes:

a target number acquisition module 81, configured to determine, according to a service scenario of an electronic device, a target number of transmission cycles into which a preset time window is divided, in which the preset time window refers to a test cycle used in compliance test for specific absorption rate SAR of the electronic device;

a transmission power determination module 82, configured to determine at least one of an upper limit value and a lower limit value of transmission power corresponding to each transmission cycle, in which an average value of transmission power in the preset time window complies a SAR requirement;

a transmission power control module 83, configured to control the electronic device to transmit and receive signals using the corresponding transmission power in each transmission cycle.

In an embodiment, the target number acquisition module includes: a first determination unit, configured to determine that the greater a number of continuous and real-time services included in the service scenario, the greater a value of the target number; and a second determination unit, configured to determine that the greater a number of non-continuous services and non-real-time services included in the service scenario, the smaller the value of the target number.

In an embodiment, the target number acquisition module includes:

a first number determination unit, configured to, when the service scenario is a first service scenario, determine that the target number of the transmission cycles is a first number, in which, the first service scenario refers to that a type of a current service of the electronic device is at least one of a non-continuous type and a non-real-time type; or a second number determination unit, configured to, when the service scenario is a second service scenario, determine that the target number of the transmission cycles is a second number, in which, the second service scenario refers to that the type of the current service of the electronic device is a continuous and real-time type: or a third number determination unit, configured to, when the service scenario is a third service scenario, determine that the target number of the transmission cycles is a third number, in which the third service scenario refers to that the type of the current service of the electronic device is a mixed service type which refers to including the continuous and real-time type and at least one of the non-continuous type and non-real-time type; in which the first number is less than the third number, and the third number is less than the second number.

In an embodiment, the transmission power determination module includes: a first adjustment determination sub-module, configured to determine an upper limit adjustment value of the transmission power corresponding to each transmission cycle according to the service scenario:

an upper limit value acquisition sub-module, configured to determine the upper limit value of the transmission power corresponding to each transmission cycle by obtaining a sum of a limited power under the SAR requirement and the upper limit adjustment value.

In an embodiment, the transmission power determination module includes: a first adjustment determination unit, configured to determine that the greater a number of continuous and real-time services included in the service scenario, the smaller the upper limit adjustment value of the transmission power; and a second adjustment determination unit, configured to determine that the greater a number of non-continuous services and non-real-time services included in the service scenario, the greater the upper limit adjustment value of the transmission power.

In an embodiment, the apparatus further includes an upper-limit-value determination module, configured to determine the upper limit value of the transmission power corresponding to each transmission cycle according to a mapping relationship between a present strength of transmission and reception signals of the electronic device and an adjustment value.

In an embodiment, the upper-limit-value determination module includes: a third determination unit, configured to, when the present strength is within a first range, determine that the adjustment value corresponding to the present strength is a first preset adjustment value; a fourth determination unit, configured to, when the present strength is within a second range, determine that the adjustment value corresponding to the present strength is a second preset adjustment value; a fifth determination unit, configured to, when the present strength is within a third range, determine that the adjustment value corresponding to the present strength is a third preset adjustment value; and a sixth determination unit, configured to, determine a sum of the limited power under the SAR requirement and the adjustment value corresponding to the present strength as the upper limit value of the transmission power corresponding to each transmission cycle: in which, the first range, the second range and the third range form a value range of strength of the transmission and reception signals: the first preset adjustment value, the second preset adjustment value, and the third preset adjustment value decreases sequentially.

In an embodiment, the upper limit values corresponding to all transmission cycles in the preset time window are same, or the upper limit value corresponding to at least one transmission cycle in the preset time window is different from the upper limit values corresponding to other transmission cycles.

In an embodiment, the transmission power determination module includes: a second adjustment determination sub-module, configured to determine the lower limit adjustment value of the transmission power according to the service scenario; and a lower limit value acquisition sub-module, configured to determine the lower limit value of the transmission power corresponding to each transmission cycle by obtaining a difference between a limited power under the SAR requirement and the lower limit adjustment value.

In an embodiment, the second adjustment determination sub-module includes: a first adjustment determination sub-module, configured to determine that the greater a number of continuous and real-time services included in the service scenario, the smaller the lower limit adjustment value of the transmission power: or a second adjustment determination sub-module, configured to determine that the greater a number of non-continuous services and non-real-time services included in the service scenario, the greater the lower limit adjustment value of the transmission power.

It should be noted that the apparatuses and devices shown in embodiments match the contents of the method embodiments, and may refer to the contents of the above-mentioned method embodiments, which will not be repeated here.

Figure 9:
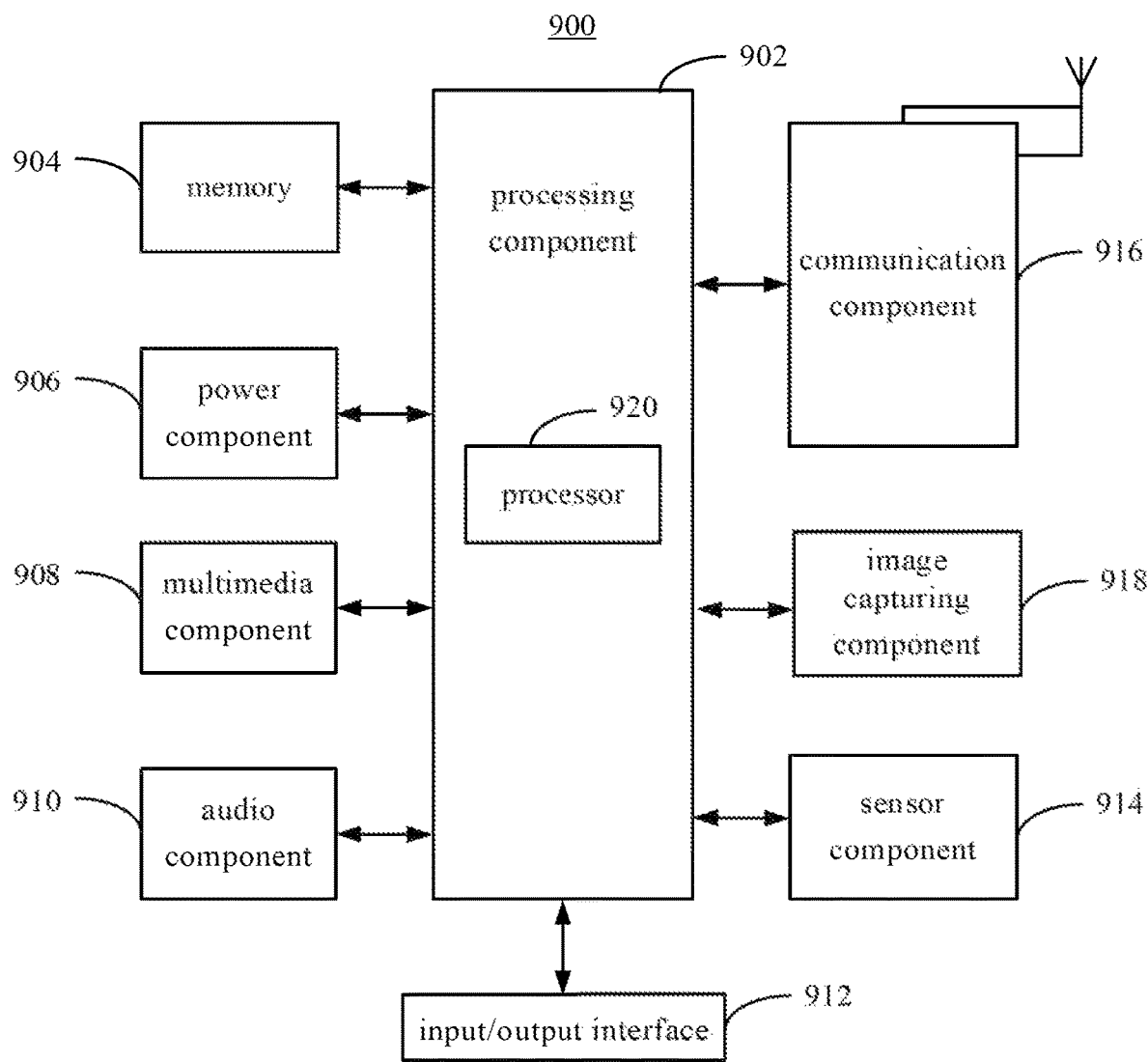
FIG. 9 is a block diagram illustrating an electronic device according to an illustrative embodiment of the present disclosure.

FIG. 9 is a block diagram of an electronic device according to an illustrative embodiment of the present disclosure. For example, the electronic device 900 may be a smartphone, a computer, a digital broadcasting terminal, a tablet device, a medical device, a fitness device, a personal digital assistant, etc.

As illustrated in FIG. 9, the electronic device 900 may include one or more of the following components: a processing component 902, a memory 904, a power component 906, a multimedia component 908, an audio component 910, an input/output (I/O) interface 912, a sensor component 914, a communication component 916 and an image capturing component 918.

The processing component 902 typically controls overall operations of the electronic device 900, such as the operations associated with display, telephone calls, data communications, camera operations, and recording operations. The processing component 902 may include one or more processors 920 to execute instructions. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the electronic device 900. Examples of such data include instructions for any applications or methods operated on the electronic device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the electronic device 900. The power component 906 may include a power management system, one or more power sources, and any other components associated with the generation, management, and distribution of power in the electronic device 900. The power module 906 may include a power chip, and the controller may communicate with the power chip, to control the power chip to turn on or turn off switches, to enable a battery to supply power to a motherboard circuit or not.

The multimedia component 908 includes a screen providing an output interface between the electronic device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 910 is configured to output and/or input audio signals. For example, the audio component 910 includes a microphone ("MIC") configured to receive an external audio signal when the electronic device 900 is in an operation mode, such as a call mode, a recording mode, and a voice recognition mode. The received audio signal may be further stored in the memory 904 or transmitted via the communication component 916. In some embodiments, the audio component 910 also includes a speaker for outputting an audio signal.

The I/O interface 912 provides an interface between the processing component 902 and peripheral interface modules, such as a keyboard, a click wheel, buttons, and the like.

The sensor component 914 includes one or more sensors to provide status assessments of various aspects of the electronic device 900. For instance, the sensor component 914 may detect an open/closed status of the electronic device 900, relative positioning of components, e.g., the display and the keypad, of the electronic device 900, a change in position of the electronic device 900 or a component of the electronic device 900, a presence or absence of a target object contact with the electronic device 900, an orientation or an acceleration/deceleration of the electronic device 900, and a change in temperature of the electronic device 900. In an example, the sensor component 914 may include a magnetic sensor, a gyroscope, and a magnetic field sensor, and the magnetic field sensor includes at least one of a Hall sensor, a thin film magnetoresistance sensor, and a magnetic fluid acceleration sensor.

The communication component 916 is configured to facilitate communication, wired or wirelessly, between the electronic device 900 and other devices. The electronic device 900 can access a wireless network based on any communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the electronic device 900 may be implemented with one or more application specific integrated circuits (ASICs), digital signal processors (DSPs), digital signal processing devices (DSPDs), programmable logic devices (PLDs), Field programmable gate arrays (FPGAs), controllers, micro-controllers, microprocessors, or other electronic components.

In exemplary embodiments, there is also provided a non-transitory readable storage medium including an executable computer program, such as a memory 904 including instructions, the above executable computer program may be executed by a processor. For example, the readable storage medium may be a ROM, a RAM, a CD-ROM, a magnetic tape, a floppy disc, an optical data storage device, and the like.

Other embodiments of the present disclosure are obvious for those skilled in the art after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by claims below.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. A method for controlling a transmission power, comprising:
   determining a target number of transmission cycles according to a service scenario of an electronic device, wherein a preset time window is divided into the target number of transmission cycles, and the preset time window is a test cycle used in a specific absorption rate (SAR) test of the electronic device;
   determining at least one of an upper limit value or a lower limit value of a transmission power corresponding to each transmission cycle, wherein an average value of transmission powers in the preset time window complies a SAR requirement; and
   controlling the electronic device to transmit and receive signals using a corresponding transmission power in each transmission cycle;
   wherein determining the upper limit value of the transmission power corresponding to each transmission cycle comprises:
   determining an upper limit adjustment value of the transmission power corresponding to each transmission cycle according to the service scenario;
   determining the upper limit value of the transmission power corresponding to each transmission cycle by obtaining a sum of a limited power under the SAR requirement and the upper limit adjustment value.

2. The method according to claim 1, wherein determining the target number of transmission cycles according to the service scenario of the electronic device comprises:
   in a first service scenario, determining that the target number of the transmission cycles is a first number, wherein, in the first service scenario, each service of the electronic device is of a non-continuous type or a non-real-time type;
   or,
   in a second service scenario, determining that the target number of the transmission cycles is a second number, wherein, in the second service scenario, each service of the electronic device is of a continuous and real-time type;
   or,
   in a third service scenario, determining that the target number of the transmission cycles is a third number, wherein in the third service scenario, each service of the electronic device is of the continuous and real-time type, or the non-continuous type, or the non-real-time type;
   wherein the first number is less than the third number, and the third number is less than the second number.

3. The method according to claim 1, wherein determining the upper limit adjustment value of the transmission power corresponding to each transmission cycle comprises:
   the greater a number of continuous and real-time services comprised in the service scenario, the smaller the upper limit adjustment value of the transmission power; or
   the greater a number of non-continuous services and non-real-time services comprised in the service scenario, the greater the upper limit adjustment value of the transmission power.

4. The method according to claim 1, further comprising:
   determining the upper limit value of the transmission power corresponding to each transmission cycle according to a mapping relationship between a signal strength of the electronic device and an adjustment value.

5. The method according to claim 4, wherein determining the upper limit value of the transmission power corresponding to each transmission cycle according to the mapping relationship between the signal strength of the electronic device and the adjustment value comprises:
   in response to the signal strength being within a first range, determining the adjustment value corresponding to the signal strength as a first adjustment value;
   in response to the signal strength being within a second range, determining the adjustment value corresponding to the signal strength as a second adjustment value;

in response to the signal strength being within a third range, determining the adjustment value corresponding to the signal strength as a third adjustment value;

determining a sum of the limited power under the SAR requirement and the adjustment value corresponding to the signal strength as the upper limit value of the transmission power corresponding to each transmission cycle;

wherein, the first range, the second range and the third range form a value range of the signal strength, a lower limit of the first range is greater than an upper limit of the second range, and a lower limit of the second range is greater than an upper limit of the third range; the first adjustment value is greater than the second adjustment value, and the second adjustment value is greater than the third adjustment value.

6. The method according to claim 1, wherein the upper limit values corresponding to all transmission cycles in the preset time window are same, or at least one upper limit value corresponding to at least one transmission cycle in the preset time window is different from the upper limit values corresponding to other transmission cycles.

7. The method according to claim 1, wherein determining the lower limit value of the transmission power corresponding to each transmission cycle comprises:

determining a lower limit adjustment value of the transmission power corresponding to each transmission cycle according to the service scenario;

determining the lower limit value of the transmission power corresponding to each transmission cycle by obtaining a difference between a limited power under the SAR requirement and the lower limit adjustment value.

8. The method according to claim 7, wherein determining the lower limit adjustment value of the transmission power according to the service scenario comprises:

the greater a number of continuous and real-time services comprised in the service scenario, the smaller the lower limit adjustment value of the transmission power; or the greater a number of non-continuous services and non-real-time services comprised in the service scenario, the greater the lower limit adjustment value of the transmission power.

9. The method according to claim 1, wherein determining the target number of transmission cycles according to the service scenario of the electronic device comprises:

the greater a number of continuous and real-time services comprised in the service scenario, the greater a value of the target number; or the greater a number of non-continuous services and non-real-time services comprised in the service scenario, the smaller the value of the target number.

10. An apparatus for controlling a transmission power, comprising:

a processor;

a memory configured to store c executable by the processor;

wherein when the computer program is executed by the processor, the processor is configured to:

determine a target number of transmission cycles according to a service scenario of an electronic device, wherein a preset time window is divided into the target number of transmission cycles, and the preset time window is a test cycle used in a specific absorption rate (SAR) test of the electronic device;

determine at least one of an upper limit value or a lower limit value of a transmission power corresponding to each transmission cycle, wherein an average value of transmission powers in the preset time window complies a SAR requirement;

control the electronic device to transmit and receive signals using a corresponding transmission power in each transmission cycle;

wherein the processor is configured to:

determine an upper limit adjustment value of the transmission power corresponding to each transmission cycle according to the service scenario;

determine the upper limit value of the transmission power corresponding to each transmission cycle by obtaining a sum of a limited power under the SAR requirement and the upper limit adjustment value.

11. The apparatus according to claim 10, wherein the processor is configured to:

in a first service scenario, determine that the target number of the transmission cycles is a first number, wherein, in the first service scenario, each service of the electronic device is of a non-continuous type or a non-real-time type;

or, in a second service scenario, determine that the target number of the transmission cycles is a second number, wherein, in the second service scenario, each service of the electronic device is of a continuous and real-time type;

or, in a third service scenario, determine that the target number of the transmission cycles is a third number, wherein in the third service scenario, each service of the electronic device is of the continuous and real-time type, or the non-continuous type, or the non-real-time type;

wherein the first number is less than the third number, and the third number is less than the second number.

12. The apparatus according to claim 10, wherein the processor is configured to implement:

the greater a number of continuous and real-time services comprised in the service scenario, the smaller the upper limit adjustment value of the transmission power; or the greater a number of non-continuous services and non-real-time services comprised in the service scenario, the greater the upper limit adjustment value of the transmission power.

13. The apparatus according to claim 10, wherein the processor is configured to implement:

determine the upper limit value of the transmission power corresponding to each transmission cycle according to a mapping relationship between a signal strength of the electronic device and an adjustment value.

14. The apparatus according to claim 13, wherein the processor is configured to implement:

in response to the signal strength being within a first range, determine the adjustment value corresponding to the signal strength as a first adjustment value;

in response to the signal strength being within a second range, determine the adjustment value corresponding to the signal strength as a second adjustment value;

in response to the signal strength being within a third range, determine the adjustment value corresponding to the signal strength as a third adjustment value;

determine a sum of the limited power under the SAR requirement and the adjustment value corresponding to the signal strength as the upper limit value of the transmission power corresponding to each transmission cycle;

wherein, the first range, the second range and the third range form a value range of the signal strength, a lower limit of the first range is greater than an upper limit of the second range, and a lower limit of the second range is greater than an upper limit of the third range; the first adjustment value is greater than the second adjustment value, and the second adjustment value is greater than the third adjustment value.

15. The apparatus according to claim 10, wherein the processor is configured to:
   determine a lower limit adjustment value of the transmission power corresponding to each transmission cycle according to the service scenario;
   determine the lower limit value of the transmission power corresponding to each transmission cycle by obtaining a difference between a limited power under the SAR requirement and the lower limit adjustment value.

16. The apparatus according to claim 15, wherein the processor is configured to implement:
   the greater a number of continuous and real-time services comprised in the service scenario, the smaller the lower limit adjustment value of the transmission power; or
   the greater a number of non-continuous services and non-real-time services comprised in the service scenario, the greater the lower limit adjustment value of the transmission power.

17. The apparatus according to claim 10, wherein the processor is configured to implement:
   the greater a number of continuous and real-time services comprised in the service scenario, the greater a value of the target number; or
   the greater a number of non-continuous services and non-real-time services comprised in the service scenario, the smaller the value of the target number.

18. A non-transitory computer-readable storage medium, wherein when a computer program stored in the storage medium is executed by a processor, a method for controlling transmission power is implemented, and the method comprises:
   determining a target number of transmission cycles according to a service scenario of an electronic device, wherein a preset time window is divided into the target number of transmission cycles, and the preset time window is a test cycle used in a specific absorption rate (SAR) test of the electronic device;
   determining at least one of an upper limit value or a lower limit value of a transmission power corresponding to each transmission cycle, wherein an average value of transmission powers in the preset time window complies a SAR requirement; and
   controlling the electronic device to transmit and receive signals using a corresponding transmission power in each transmission cycle;
   wherein determining the upper limit value of the transmission power corresponding to each transmission cycle comprises:
   determining an upper limit adjustment value of the transmission power corresponding to each transmission cycle according to the service scenario;
   determining the upper limit value of the transmission power corresponding to each transmission cycle by obtaining a sum of a limited power under the SAR requirement and the upper limit adjustment value.

\* \* \* \* \*